US008936172B2

(12) United States Patent
Hicks

(10) Patent No.: US 8,936,172 B2
(45) Date of Patent: Jan. 20, 2015

(54) COOLER FOR A GAME HEAD

(76) Inventor: Brian Hicks, Lumberton, TX (US)

(*) Notice: Subject to any disclaimer, the term of this patent is extended or adjusted under 35 U.S.C. 154(b) by 0 days.

(21) Appl. No.: 13/324,717

(22) Filed: Dec. 13, 2011

(65) Prior Publication Data

US 2012/0145720 A1 Jun. 14, 2012

Related U.S. Application Data

(60) Provisional application No. 61/422,497, filed on Dec. 13, 2010.

(51) Int. Cl.
| | | |
|---|---|---|
| *B65D 81/38* | (2006.01) | |
| *B65D 37/00* | (2006.01) | |
| *A45C 3/00* | (2006.01) | |
| *A45C 11/20* | (2006.01) | |
| *A45C 13/10* | (2006.01) | |

(52) U.S. Cl.
CPC . *B65D 37/00* (2013.01); *A45C 3/00* (2013.01); *A45C 11/20* (2013.01); *A45C 13/10* (2013.01); *A45C 2003/008* (2013.01)
USPC .................... 220/592.2; 220/592.03; 383/110; 383/99; 383/98; 383/61.3; 383/61.1; 62/457.7; 62/457.1

(58) Field of Classification Search
CPC .......... B65D 37/00; A45C 3/00; A45C 11/20; A45C 13/10
USPC ................... 220/592.03, 592.2, 915.1–915.2; 383/97, 110, 61.1, 61.3, 93, 95, 98–99; 206/525; 62/457.1–457.2, 457.7, 530; 224/921
See application file for complete search history.

(56) References Cited

U.S. PATENT DOCUMENTS

| | | | | | |
|---|---|---|---|---|---|
| 2,062,001 | A | * | 11/1936 | Grenier | 383/59 |
| 2,107,216 | A | * | 2/1938 | Rogers | 383/33 |
| 2,289,254 | A | * | 7/1942 | Eagles | 383/97 |
| 2,324,495 | A | * | 7/1943 | Deming | 220/592.2 |
| 3,102,570 | A | * | 9/1963 | Fairchilds | 383/97 |
| 3,292,748 | A | * | 12/1966 | Rifkin | 190/119 |
| 3,674,073 | A | * | 7/1972 | Hendon | 383/18 |
| 3,998,304 | A | * | 12/1976 | Edgerton et al. | 190/107 |
| 4,112,556 | A | * | 9/1978 | Flaum et al. | 383/97 |
| 4,204,565 | A | * | 5/1980 | Nohmura | 383/99 |
| 4,378,866 | A | * | 4/1983 | Pelavin | 190/111 |
| 4,865,463 | A | * | 9/1989 | Howard | 383/33 |
| 4,953,674 | A | * | 9/1990 | Landes | 383/111 |
| 5,207,254 | A | * | 5/1993 | Fromm | 190/110 |
| 5,297,870 | A | * | 3/1994 | Weldon | 383/97 |
| 5,761,992 | A | | 6/1998 | Gallo | |
| 5,800,061 | A | * | 9/1998 | Volles | 383/15 |
| 5,873,504 | A | * | 2/1999 | Farmer | 190/111 |

(Continued)

*Primary Examiner* — Mickey Yu
*Assistant Examiner* — Brijesh V. Patel
(74) *Attorney, Agent, or Firm* — Patterson & Sheridan, LLP

(57) ABSTRACT

The present invention generally relates to a cooler for transferring a game head. In one aspect, a game head transfer device is provided. The device includes a body having an opening on an upper portion that is configured to receive a game head into the body, wherein a first portion and a second portion of the game head extend from the opening of the body when the body is in an opened position and a closed position. The device further includes one or more flap members configured to narrow the opening of the body between the first portion and the second portion of the game head. The device also includes one or more closing members configured to narrow the opening of the body adjacent a side of the first portion and a side of the second portion of the game head that extend from the opening.

14 Claims, 5 Drawing Sheets

(56) References Cited

U.S. PATENT DOCUMENTS

| | | | |
|---|---|---|---|
| 6,048,099 A * | 4/2000 | Muffett et al. | 383/20 |
| 6,068,402 A * | 5/2000 | Freese et al. | 383/110 |
| 6,135,333 A * | 10/2000 | Tucker et al. | 224/646 |
| 6,183,133 B1 * | 2/2001 | Roegner | 383/39 |
| 6,247,328 B1 * | 6/2001 | Mogil | 62/457.2 |
| 6,253,569 B1 | 7/2001 | Hall | |
| 6,386,414 B1 * | 5/2002 | Kilduff | 224/638 |
| 6,510,705 B1 | 1/2003 | Jackson | |
| 6,561,355 B1 * | 5/2003 | Forbes et al. | 206/527 |
| 6,609,626 B2 * | 8/2003 | Young et al. | 220/592.03 |
| 7,400,256 B2 | 7/2008 | Knopik et al. | |
| 7,634,919 B2 | 12/2009 | Bernhard, Jr. et al. | |
| 7,954,503 B2 * | 6/2011 | Glass | 135/95 |
| 2002/0181806 A1 * | 12/2002 | Godshaw et al. | 383/6 |
| 2003/0183668 A1 * | 10/2003 | Hancock et al. | 224/401 |
| 2005/0082132 A1 * | 4/2005 | Smith | 190/111 |
| 2008/0196217 A1 * | 8/2008 | Eschbach | 24/386 |
| 2009/0101664 A1 * | 4/2009 | Bartol | 220/745 |
| 2009/0194541 A1 * | 8/2009 | Mayo | 220/495.06 |
| 2009/0304310 A1 * | 12/2009 | Nitti | 383/64 |
| 2012/0128270 A1 * | 5/2012 | West et al. | 383/6 |

* cited by examiner

COOLER FOR A GAME HEAD

CROSS-REFERENCE TO RELATED APPLICATIONS

This application claims benefit of U.S. provisional patent application Ser. No. 61/422,497, filed Dec. 13, 2010, which is herein incorporated by reference.

BACKGROUND OF THE INVENTION

1. Field of the Invention

Embodiments of the present invention generally relate to a cooler. More particularly, embodiments of the present invention relate to a cooler for transferring a game head.

2. Description of the Related Art

During the hunting season, a hunter will hunt wild game animals, such as a buck. After the hunter has killed a wild game animal, the hunter may want to transport the head (e.g., game head) of the wild game animal from the hunting location to a taxidermist in order to mount the game head. It is important to keep the game head cool and protect the game head during transport so that the game head will not get damaged. There is a need therefore for a method and an apparatus to cool and transport the game head from the hunting location.

SUMMARY OF THE INVENTION

The present invention generally relates to a cooler for transferring a game head. In one aspect, a game head transfer device is provided. The game head transfer device includes a body having an opening on an upper portion that is configured to receive a game head into the body, wherein a first portion and a second portion of the game head extend from the opening of the body when the body is in an opened position and a closed position. The game head transfer device further includes one or more flap members configured to narrow the opening of the body between the first portion and the second portion of the game head that extend from the opening. The game head transfer device also includes one or more closing members configured to narrow the opening of the body adjacent a side of the first portion and a side of the second portion of the game head that extend from the opening.

In another aspect, a method of using a game head transfer device is provided. The method includes the step of inserting a game head into an opening of the device, wherein a first portion and a second portion of the game head extend from the opening. The method further includes the step of narrowing the opening of the device between the first portion and the second portion of the game head that extend from the opening. The method also includes the step of further narrowing the opening of the device adjacent a side of the first portion and a side of the second portion of the game head that extend from the opening.

In yet another aspect, a cooler for a game head is provided. The cooler includes an insulated body having a transport area that is configured to receive a game head into the body such that a portion of the game head extends from an opening of the insulated body when the insulated body is closed. The cooler further includes a first flap member and a second flap member that are configured to close around the portion of the game head that extends from the opening. The cooler also includes a first closing member and a second closing member that are configured to narrow the opening of the insulated body.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention generally relates to a cooler for transferring a game head. The cooler will be described herein for the transfer of the game head from a hunting location. It is to be understood, however, that the cooler may also be used for other purposes when the cooler is not transporting the game head, such as cooling and transferring items, such as food and drinks. To better understand the novelty of the cooler of the present invention and the methods of use thereof, reference is hereafter made to the accompanying drawings.

Figure 1:
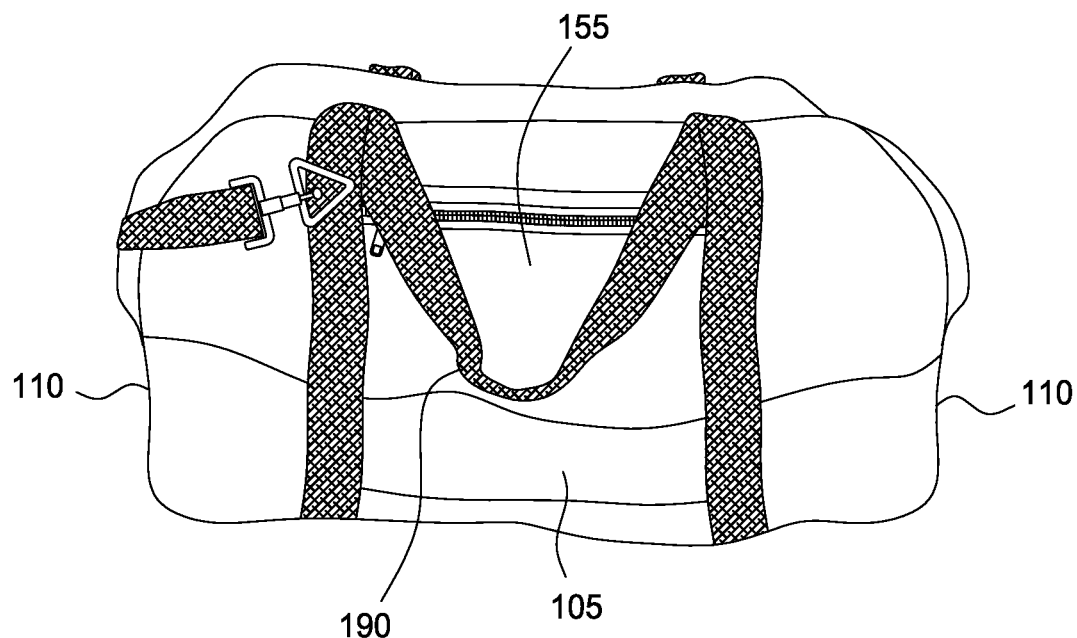
FIGS. 1 and 2 are views illustrating a game head transfer device.
Figure 2:
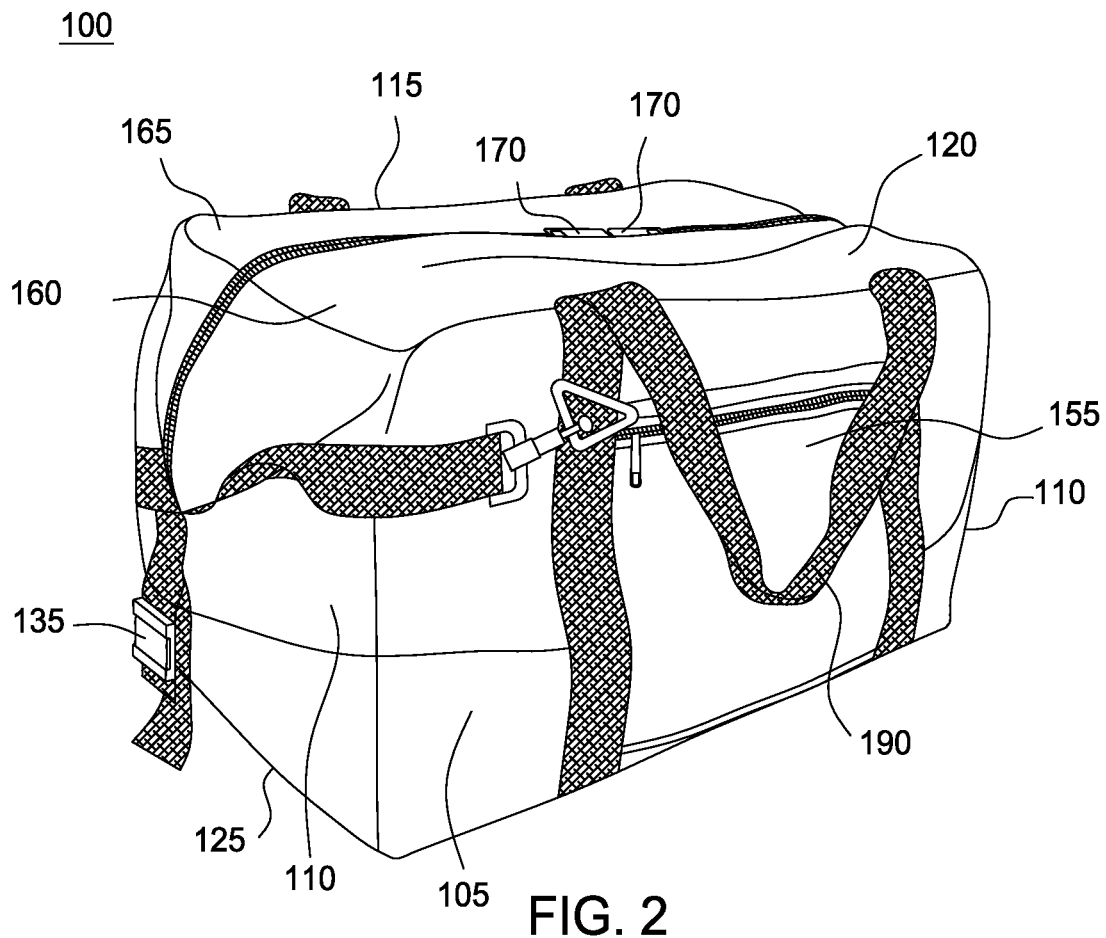
Figure 4:
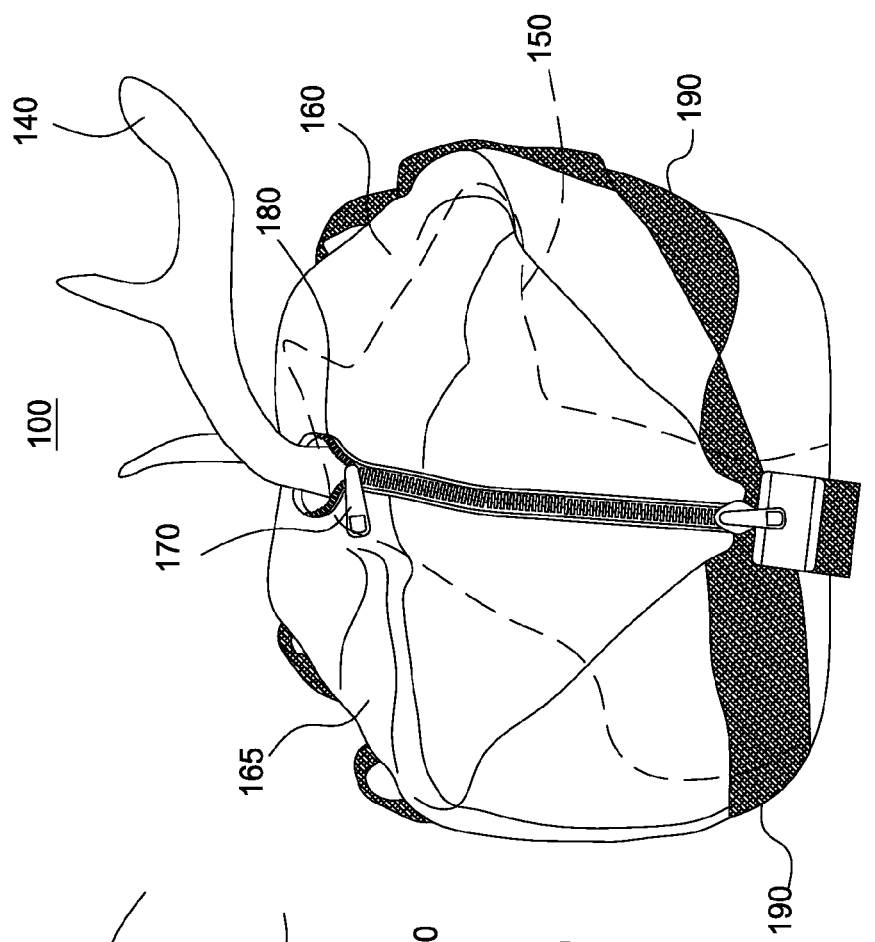
FIG. 4 is a view illustrating the game head transfer device with a game head.

FIGS. 1 and 2 are views illustrating a game head transfer device 100. Generally, the game head transfer device 100 is used to cool and transfer a game head 150 (FIG. 4). The game head transfer device 100 includes a front portion 105, side portions 110, a back portion 115, a top portion 120 and a closed bottom portion 125. The portions 105, 110, 115, 120, 125 have waterproof surfaces and include insulation between the surfaces. In one embodiment, the insulation in portions 105, 110, 115, 120, 125 is made from foil bubble insulation, PET aluminum bubble insulation, aluminum foam insulation or any other insulation products known in the art. Further, the portions 105, 110, 115, 120, 125 are made from flexible material which allows the portions 105, 110, 115, 120, 125 to conform to the items stored within the game head transfer device 100. The flexible material of the portions 105, 110, 115, 120, 125 also allows the game head transfer device 100 to collapse into a smaller configuration when the game head transfer device 100 is not in use. In one embodiment, the bottom portion 125 includes reinforcement members that are configured to maintain the shape of the bottom portion 125 and support the game head 150. As shown, the side portions 110 of the game head transfer device 100 may include buckles 135 that are used to secure the game head transfer device 100 in a closed position. The front portion 105 and the back portion 115 may include handles 190 for use in carrying the game head transfer device 100.

In one embodiment, the game head transfer device 100 may include an optional side pocket 155 on the front portion 105 for storage. The side pocket 155 may have a closing member, such as a zipper. There may be a similar side pocket 155 on the back portion 115. An outside surface of the side pocket 155 may be used for attaching a logo, emblem or symbol. In one embodiment, the portions 105, 110, 115, 120, 125 are made from a thermal material that changes color as the temperature changes within the game head transfer device 100. In one embodiment, an optional temperature gauge may be disposed within the front portion to indicate the temperature within the game head transfer device 100.

Figure 3:
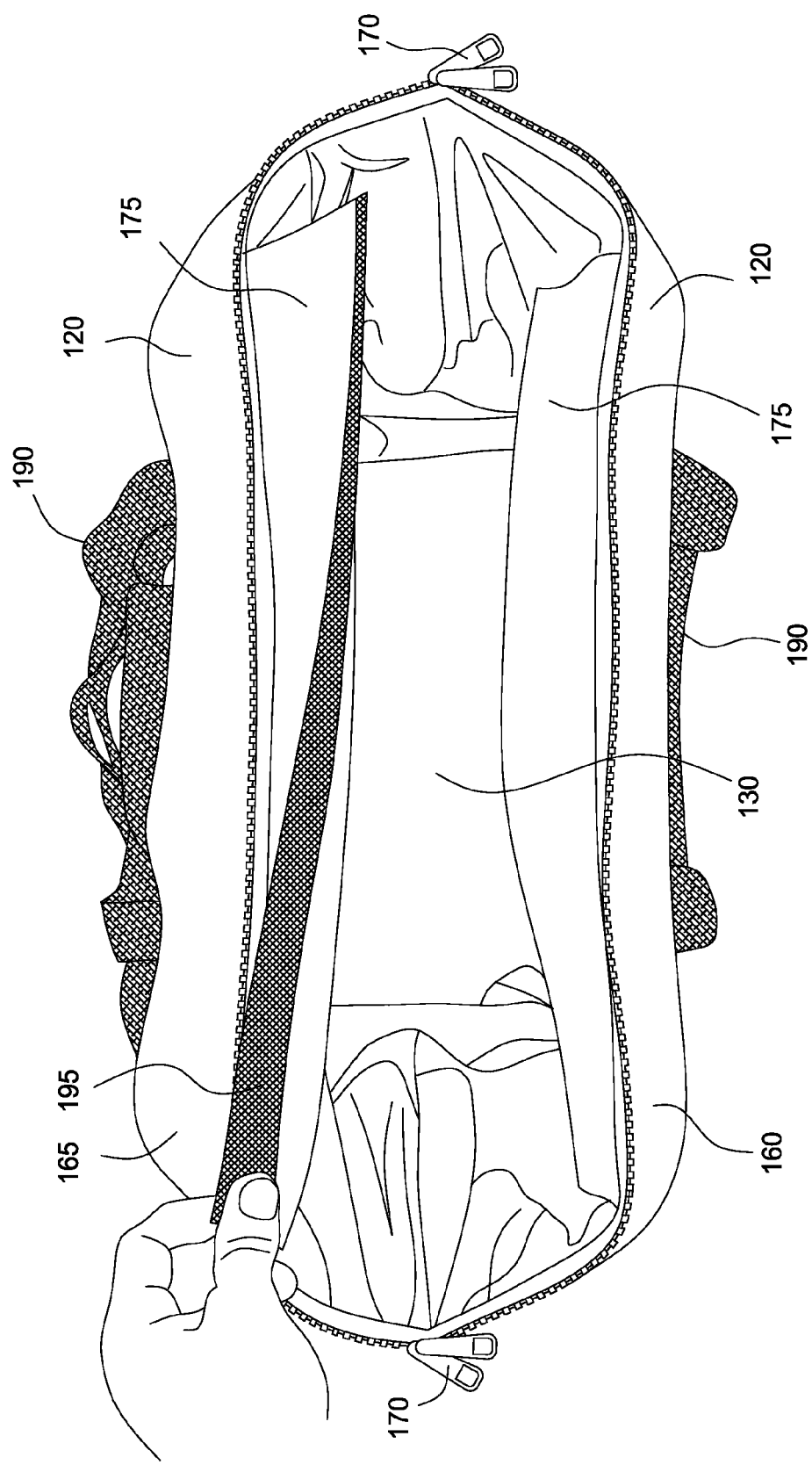
FIG. 3 is a view illustrating the game head transfer device in an open position.

FIG. 3 is a view illustrating the game head transfer device 100 in an open position. The portions 105, 110, 115, 120, 125 define a body having a transport area 130 that is configured to hold the game head 150 (or other items). As shown in FIG. 3, the transport area 130 has an initial predefined shape, such as a square or a rectangle, but any geometric shape may be used without departing from principles of the present invention.

The top portion 120 includes a first side 160 and a second side 165. Each side 160, 165 includes a closing member 170, such as a zipper, which is used to close the transport area 130. Each side 160, 165 further includes a closing flap 175 that extends from a point below the closing member 170 to a point in the transport area 130. In the embodiment illustrated, the closing flap 175 extends substantially along the entire length of the respective side 160, 165. Generally, the closing flaps 175 are used to seal or close the top portion 120 of the game head transfer device 100 when the game head 150 is in the transport area 130, as will be described herein.

The closing flaps 175 have a fixed end that is attached to the top portion 120 and a free end. The free end of the closing flaps 175 are configured to rotate around the fixed end to any number of positions. The free end of the closing flaps 175 include releasable connection members 195 on an inner portion of the respective flap 175, such as Velcro, that is used to secure the free end of the closing flap 175 on the first side 160 to the free end of the closing flap 175 on the second side 165. In other words, the releasable connection members 195 are configured to mate with each other to seal or close the top portion 120 of the game head transfer device 100 when the game head 150 is in the transport area 130. As such, the closing flaps 175 provide a first means for closing or sealing around the game head 150, and the closing member 170 provides a second means for closing or sealing around the game head 150. In one embodiment, a connection member (not shown) may be disposed on the inner surface of the portions 105, 110, 115 that is configured to engage the releasable connection members 195 to secure the free end of the closing flaps 175 in place when the closing flaps 175 are not in use. The connection members may be any type of connection member known in the art, such as Velcro or clips. Although the game head transfer device 100 in FIG. 3 shows two flaps 175, any number of flaps 175 may be used without departing from principles of the present invention. In one embodiment, a single flap is used on the first side 160 that has a fixed end and a free end. The single flap has releasable connection members on an inner portion of the free end of the single flap that is configured to engage releasable connection members on the second side 165.

Figure 6:
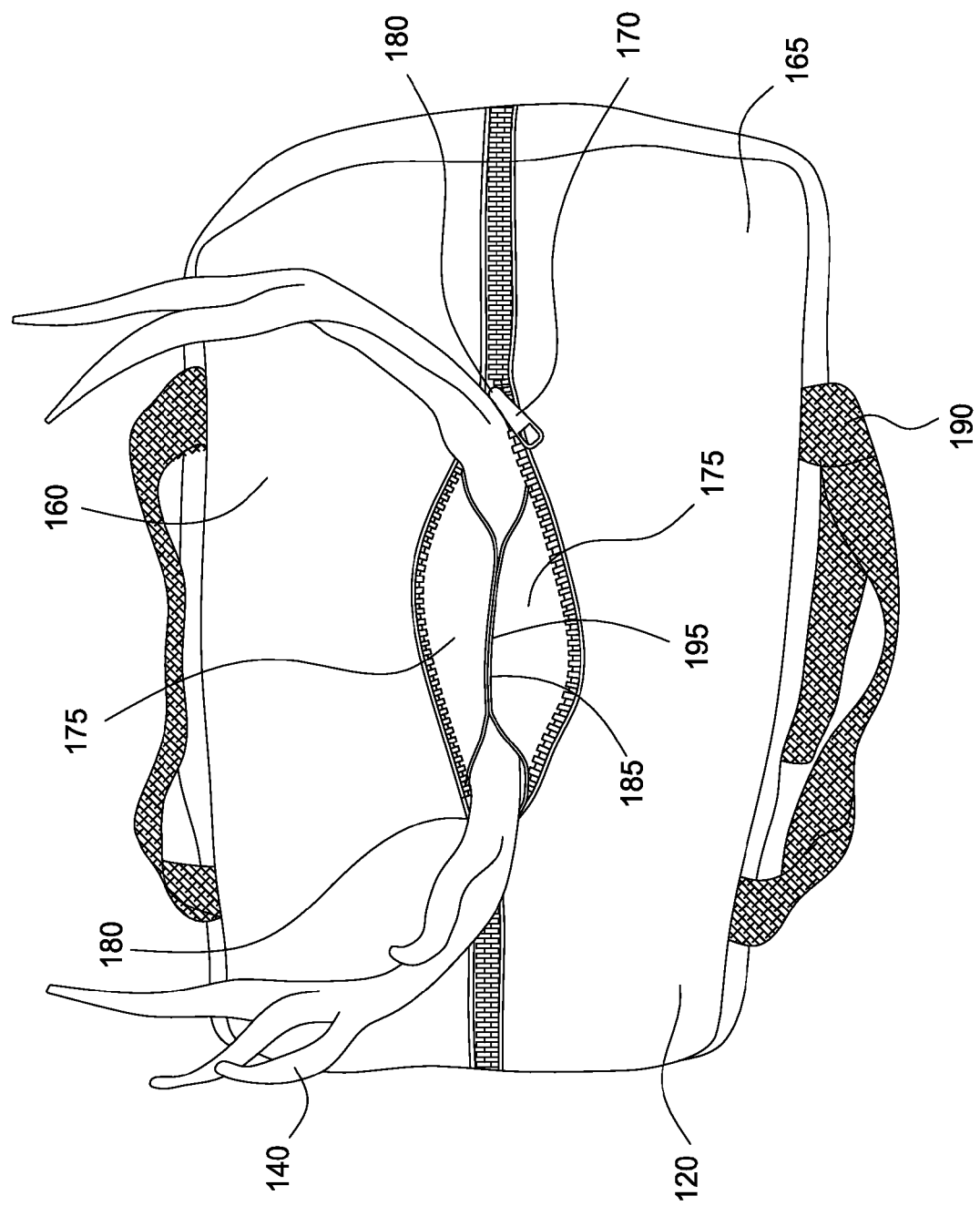
FIGS. 6 and 7 are other views illustrating the game head transfer device in the closed position.

FIG. 4 is a view illustrating the game head transfer device 100 with the game head 150. In comparing FIG. 2 and FIG. 4, the transport area 130 has been reconfigured to accommodate the game head 150. The flexible material of the portions 105, 110, 115, 120, 125 allow the transport area 130 to conform to the game head 150. As shown in FIG. 4, a portion 140 (e.g., antlers) of the game head 150 extends from the game head transfer device 100. The portion 140 may include a first portion (e.g., first antler) and a second portion (e.g., second antler). The closing flaps 175 and the closing members 170 are configured to allow the portion 140 of the game head 150 to protrude outside of the game head transfer device 100, while at the same time closing the top portion 120 to maintain a cool temperature within the game head transfer device 100. As shown, the closing flaps 175 close the top portion 120 to a point 145 adjacent each outer side of the portion 140 of the game head 150 extending outside of the game head transfer device 100. The closing flaps 175 may be configured to also close an area 185 between the first portion and the second portion of the game head 150 extending outside of the game head transfer device 100 (FIG. 6). The closing flaps 175 are also configured to stabilize (or hold) the game head 150 in a position within the transport area 130. The flexibility of the arrangement of the closing flaps 175 allows the game head transfer device 100 to be used for different sized game heads and/or antlers.

The game head transfer device 100 may also include a removable inner liner (not shown) that fits in the transport area 130. The inner liner may be made from a flexible material and the inner liner may be removed from the game head transfer device 100 for easy clean-up after usage. The game head transfer device 100 may also include pockets inside the transport area 130 for cooling material such as ice.

Figure 5:
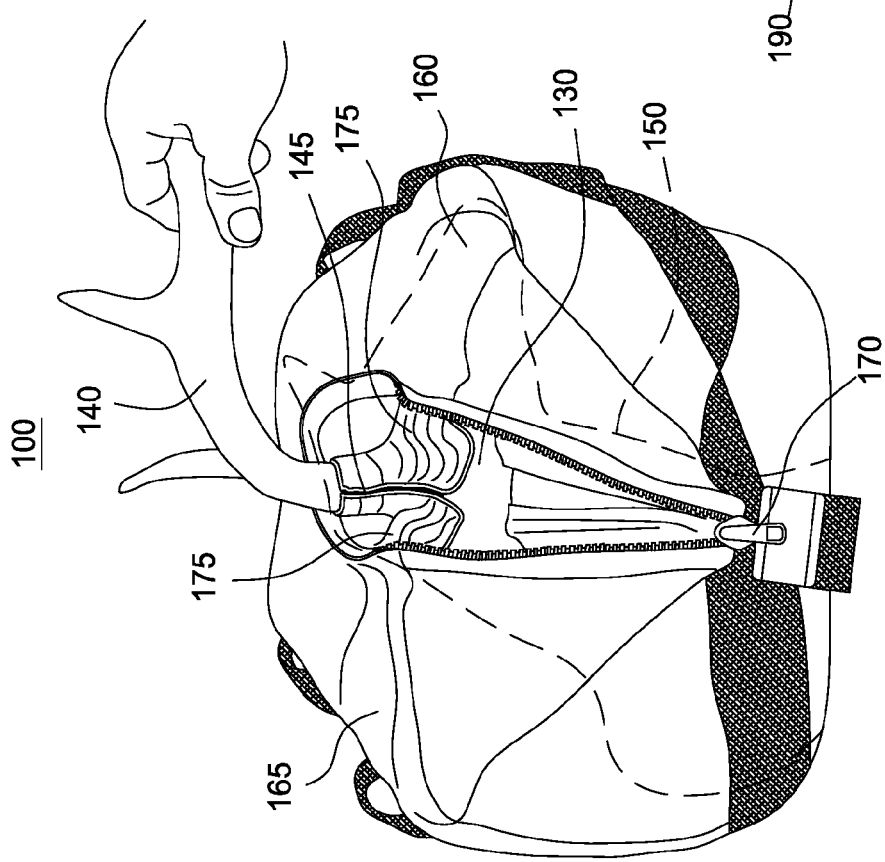
FIG. 5 is a view illustrating the game head transfer device in a closed position with the game head.
Figure 7:
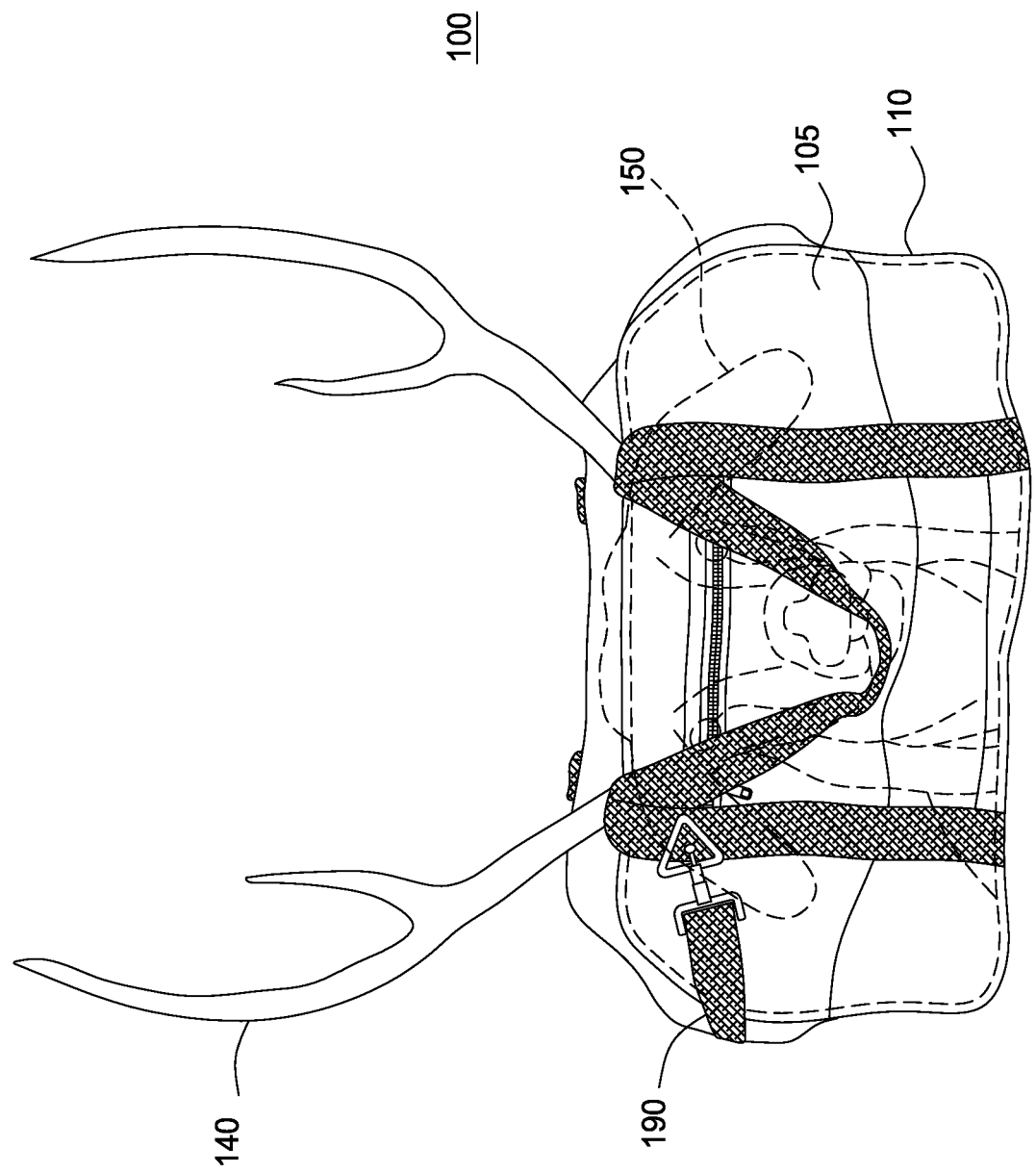

FIGS. 5-7 are views illustrating the game head transfer device 100 in a closed position. As shown, the closing members 170 have been closed to a point 180 on each side of the portion 140 of the game head 150 that protrudes outside of the game head transfer device 100. The closing members 170 enclose the closing flaps 175 (and the point 145) to add additional closure of the top portion 120 adjacent the sides of the portion 140. The closing members 170 also provide additional support to maintaining the game head 150 within the transport area 130. As shown in FIG. 6, one closing member 170 is disposed on one side of the portion 140 of the game head 150, and another closing member 170 is disposed on the other side of the portion 140 of the game head 150. The closing member 170 arrangement allows for both sides of the portion 140 of the game head 150 to be closed. The flexibility of the arrangement of the closing flaps 175 and the closing members 170 allows the game head transfer device 100 to accommodate different sized game heads.

While the foregoing is directed to embodiments of the present invention, other and further embodiments of the invention may be devised without departing from the basic scope thereof, and the scope thereof is determined by the claims that follow.

The invention claimed is:

1. A game head transfer device comprising:
   a body having an opening on an upper portion that is movable between an opened position and a closed position;
   a first zipper member that closes the opening from one side of the body;
   a second zipper member that closes the opening from an opposite side of the body;
   a first flap member having a fixed end attached to the body at a point below the first zipper member and an opposite free end having a releasable connection member disposed on an inner portion of the free end; and
   a second flap member having a fixed end attached to the body at a point below the second zipper member and an opposite free end having a mating releasable connection disposed on an inner portion of the free end that attaches with the releasable connection member on the first flap member to close the opening of the body;
   wherein the releasable connection member attaches to the mating releasable connection member so that the first and second flap members close a portion of the opening without the first zipper member and the second zipper member having to close the same portion of the opening.

2. The game head transfer device of claim 1, wherein the first flap member is attached to one side of the body and the second flap member is attached to an opposite side of the body.

3. The game head transfer device of claim 2, wherein side portions of the body include a buckle to secure the game head transfer device in the closed position.

4. The game head transfer device of claim 3, wherein the first and second flap members extend along substantially the entire length of the opening of the body.

5. The game head transfer device of claim 1, wherein the body has a first shape when the body is empty and the body has a second shape when a game head is disposed in the body.

6. The game head transfer device of claim 1, wherein at least one of the first zipper member and the second zipper member is configured to close substantially the entire opening of the body.

7. A method of using a game head transfer device, the method comprising:
   inserting a game head into an opening of the game head transfer device, the game head transfer device having a first flap member that has a fixed end attached to one side of the opening and a releasable connection member disposed on an inner portion of an opposite free end that attaches to a mating releasable connection member disposed on an inner portion of a free end of a second flap member having a fixed end attached to an opposite side of the opening, wherein a first portion and a second portion of the game head extend from the opening;
   closing the opening from one side of the game head transfer device to the first portion of the game head using a first zipper member;
   closing the opening from an opposite side of the game head transfer device to the second portion of the game head using a second zipper member; and
   closing an area of the opening between the first portion and the second portion of the game head by attaching the releasable connection member of the first flap member to the mating releasable connection member of the second flap member so that the flap members close the area without the first zipper member and the second zipper member closing the same area of the opening between the first portion and the second portion of the game head.

8. The method of claim 7, wherein the first and second flap members extend along substantially the entire length of the opening.

9. The method of claim 7, wherein the flap members also close around the first portion and the second portion of the game head that extend from the opening of the game head transfer device.

10. A cooler for a game head comprising:
    an insulated body having an opening and a transport area disposed within the insulated body;
    a first flap member and a second flap member, the first flap member having a fixed end attached to the insulated body and an opposite free end having a releasable connection member disposed on an inner portion of the free end that is attachable to a mating releasable connection member disposed on an inner portion of a free end of the second flap member;
    a first zipper member that closes the opening from one side of the insulated body; and
    a second zipper member that closes the opening from an opposite side of the insulated body,
    wherein the releasable connection member attaches to the mating releasable connection member such that the first and second flap members close a portion of the opening without using the first and second zipper members to close any part of the opening.

11. The cooler of claim 10, wherein the second flap member includes a fixed end attached to the insulated body.

12. The cooler of claim 11, wherein the free end of the first and second flap members is configured to rotate relative to the fixed end.

13. The cooler of claim 10, wherein the first flap member is disposed on one side of the opening, and the second flap member is disposed on an opposite side of the opening.

14. The cooler of claim 10, wherein the first and second flap members are configured to close substantially the entire opening of the insulated body, and wherein at least one of the first zipper member and the second zipper member is configured to close substantially the entire area above the opening that is closed by the first and second flap members.

\* \* \* \* \*